3,044,959
WELL FRACTURING
Robert C. Martin, Tulsa, Okla., assignor to The Dow Chemical Company, Midland, Mich., a corporation of Delaware
No Drawing. Filed Jan. 15, 1959, Ser. No. 786,905
10 Claims. (Cl. 252—8.55)

The invention relates to an improved fluid-loss preventive composition and to a method employing the composition for fracturing subterranean formations traversed by a well.

Fracturing of fluid bearing subterranean formations, to increase or revive the flow of fluid therefrom by injecting a liquid therein at pressures sufficient to create fissures and cracks in the formation, has long been practiced. The basic steps of the methods employed are broadly those of Reissue Patent 23,733 of U.S. Patent 2,596,843 to Farris. A number of improvements in the fracturing liquid employed and the method of use have been developed since the issuance of the aforesaid patent.

Among such improvements have been the admixture of various compounds with the fracturing liquid for the purpose of lessening the loss of the fracturing liquid into the formation. Such compounds are referred to generally as fluid-loss preventives. Compounds that have attained this purpose have done so largely by temporarily plugging off passageways leading from the well and plastering the porous walls of the formation and thereafter, due to some property inherent in the compound employed, dissolving, disintegrating or otherwise becoming, at least to some extent, dislodged from the porous walls of the formation. Among such compounds are soaps, organic acids intermixed with caustic to produce soaps in situ, asphaltic materials, lignin in an acidic medium, and finely divided inorganic material with or without dispersants and/or thickeners.

Effective compounds heretofore added to fracturing liquids to lessen fluid-loss in the formation during use have comprised solids in a particulated or powdered form. Particulated and powdered substances have associated therewith a number of disadvantages which would not be encountered if an effective liquid substance had been available. Among such disadvantages are the comparative difficulties of transporting and handling particulated solid materials. Since such materials cannot be handled in bulk, they are customarily placed in bags or similar type packages suitable for accommodating convenient weights and transported in such packages to the site of the well to be treated, and there dumped from the packages into a mixer, hopper, feeder, or the like. The use of individual packages or containers entails extensive lifting, carrying, piling, and hoisting of them followed by the opening of each individual bag or other type package and expelling the contents therefrom under field conditions. Such conditions frequently include a brisk wind which makes emptying of bags an onerous task. A liquid compound not only can be readily transported to the well in large capacity tanks or pumped thereto, but also pumped as required into mixers at the well site, readily metered, and more readily admixed with another liquid than can a particulated solid.

A further difficulty sometimes encountered in known fluid-loss preventives is the incompatibility thereof with even small percentages of water in the fracturing liquid, some being incapable of operating when even as little as 0.5 percent of water is present therein.

Another disadvantage associated with some known fluid-loss preventives is the difficulty of their removal from the formation following a fracturing operation.

A still further difficulty in the use of certain known fluid-loss preventives is their inability to serve the intended purpose in wells wherein the temperature is relatively high, e.g., 150° F. to over 200° F.

An object of the invention accordingly is to provide an effective fluid-loss preventive which is a stable liquid under all conditions normally encountered in storage, shipment and use. Another object is to provide a fluid-loss preventive which is compatible with water. A further object is to provide a fluid-loss preventive which can be readily admixed with a major proportion of a carrier liquid and the resulting admixture effectively employed to fracture subterranean formations. A still further object is to provide a fracturing liquid which is readily flushed from the well following the fracturing operation, and may be employed in wells wherein the bottomhole temperature can be any value from 50° to one in excess of 200° F.

How these and related objects are attained in accordance with the invention is made clear in the ensuing description and is particularly defined in the appended claims.

The invention, therefore, is a novel fluid-loss preventive composition, the fracturing liquid prepared by admixture of said preventive and a major proportion of a carrier fracturing liquid, and improved fracturing method which obviates the above-named disadvantages and difficulties associated with known fracturing compositions and the method of fracturing subterranean formations employing such known compositions.

The composition is a water-in-oil type emulsion consisting essentially of water or brine emulsified with a liquid hydrocarbon by having admixed therewith a carboxylic acid containing between 8 and 18 carbon atoms per molecule, at least about 35 percent by weight of which are fatty acids, an hydroxide of a polyvalent metal in excess of the stoichiometric quantity required to react with the carboxylic groups of the acid, and an alcohol-type thinning agent, preferred amounts and the properties of the constituents for the purpose of the invention being more fully described hereinafter.

In the practice of the invention, the fatty acid employed can be any saturated or unsaturated carboxylic fatty acid or mixture thereof or such fatty acids containing up to 65 percent by weight of rosin acids. It is preferable that unsaturated acid makes up a substantial portion of the fatty acids. Illustrative of a mixture of fatty and rosin acids is tall oil.

Tall oil is the preferred acid to use. It is highly effective for the purposes of the invention and readily available.

Tall oil is a viscous liquid comprising a mixture of fatty acids and rosin acids together with nonacidic substances which is obtained by acidifying the black liquor skimmings produced in the sulfate (kraft) process of wood pulp manufacture using resinous wood such as pine. The fatty acids include a major proportion of linoleic and oleic acids and somewhat similar amounts of adipic and sebacic acids. The rosin acids are abietic and pimaric type acids. The nonacidic portions are largely hydrocarbons and alcohol, e.g., b-sitosterol.

Crude tall oil may contain from 18 to 60 percent fatty acids, from 28 to 65 percent rosin acids, and from 5 to 24 percent nonacid substances. However, the crude tall oil of commerce usually contains from 46 to 52 percent fatty acids, from 40 to 45 percent rosin acids, and from 6.5 to 8 percent unsaponifiables. Although crude tall oil is suitable, refined or purified tall oil is preferred in the practice of the invention. Refined tall oil falls within the following specifications:

| Color (Gardner) | Acid Number | Saponification Number | Iodine Number | Percent Fatty Acid | Percent Rosin Acid | Percent Unsaponifiables |
|---|---|---|---|---|---|---|
| 9-14 | 155-183 | 158-185 | 143-210 | 37-52 | 32-65 | 4-12 |

Examples of commercially available refined tall oils are: Unitol, Facoil, Liquo, Rosoil, Indusoil, Acintol, and Pamak.

The hydroxide suitable for the practice of the invention can be any hydroxide of a polyvalent metal which is reactive with the organic acid present to yield an oil-soluble soap. Examples of suitable hydroxides are those of alkaline earth metals, zinc, and aluminum. The preferred hydroxide is $Ca(OH)_2$. Alkali metal hydroxides and ammonium hydroxide are not suitable.

The hydrocarbon oil may be a petroleum oil or organic solvent, e.g., crude oil or medium-boiling fractions thereof obtained by fractional distillation such as diesel oil, gas oil, distillate, naphtha, and kerosene, or such organic solvents as benzene, xylene and toluene. The viscosity of the oil at the temperatures used should be sufficiently low for easy mixing and pumping. The organic carrier usually employed is kerosene.

The thinning agent is an aliphatic or aromatic monoalcohol of between 4 and 12 carbon atoms. Natural or synthetic pine oil, which contains substantial proportions of the monocyclic conjugated diene monoalcohol, known as terpineol ($C_{10}H_{17}OH$), is the preferred alcohol to employ. Natural pine oil is a commercially available product obtained by the steam distillation of pine wood, bark, cones or needles. Pine stumps, brush and waste materials associated with the production of pine lumber are usually employed as the raw materials. Synthetic pine oil is obtained largely by separating $\alpha$-pinene, which usually also contains some $\beta$-pinene, from oil of turpentine and subsequently hydrating the pinenes to terpin hydrates and thence, by continued and carefully controlled dehydration, to terpene alcohols, largely $\alpha$-terpineol. Terpenes themselves are not suitable for the practice of the invention.

Water, in an amount in excess of that formed by the interaction of the hydroxide and organic acid, or a brine, is an essential component of the treating composition. The water or brine renders the composition more fluid and facilitates the transfer, as by pumping, of the composition into the vessels for further mixing with oil or water for the fracturing of the formation. The water or brine also enhances the fluid loss preventive properties of the composition, apparently, by its having a thickening effect upon the soap formed in situ and thereby increasing the temporary plugging properties of the composition. Brines are as suitable for use as water since the presence of dissolved inorganic salts commonly found in surface and underground waters, e.g., NaCl or $CaCl_2$, has no serious effect upon the efficacy of the fracturing composition. The amounts of water or brine and the hydrocarbon oil to employ to prepare the fluid-loss preventive may be broadly defined as those relative amounts necessary to form a water-in-oil emulsion. The amount of the carboxylic acid necessary may be broadly defined as that necessary to effect emulsification of the water or brine and oil in the presence of an excess of a polyvalent metal hydroxide. The amount of alcohol thinner is not highly critical but must be present in sufficient amount to make the composition fluid but yet not in an amount that is economically wasteful.

The amount of the fluid-loss preventive thus prepared is subsequently admixed with the carrier fracturing liquid for fracturing. The fracturing liquid thus prepared may broadly be said to be a minor proportion of the preventive and a major proportion of carrier liquid. However, in actual practice, it has been found that a relatively small percent of the preventive is required for satisfactory results.

The preferred and especially recommended limits of the ingredients of the fluid-loss preventive composition of the invention based upon 100 parts of tall oil are set out below in Table I. The ingredients shown in Table I were selected for illustrative purposes and an amount of any monocarboxylic acid of 8 to 18 carbon atoms yielding equivalent available carboxylic groups to that of 100 parts by weight of tall oil may be used in place of the tall oil; other polyvalent hydroxides yielding an excess of OH ions over the amount necessary to react with the carboxylic groups present in place of $Ca(OH)_2$; other hydrocarbon oils of suitable viscosity, e.g., between 5 and 500 centipoises at 80° F. in place of the kerosene; and other alcohols as hereinbefore described in place of the pine oil.

TABLE I

*Illustrative Composition of Fluid-Loss Preventive for Use in the Invention in Parts by Weight*

| Ingredients | Operable Limits | Preferred Limits |
|---|---|---|
| Tall Oil | 100 | 100 |
| $Ca(OH)_2$ | 15-60 | 25-50 |
| Kerosene | 65-100 | 70-90 |
| Water | 50-225 | 75-200 |
| Pine Oil | 10-60 | 20-40 |

An excess of $Ca(OH)_2$ is employed over the stoichiometric quantity required to react with the carboxylic groups provided by tall oil or other carboxylic acids employed. The hydroxide should be present in an amount sufficient to provide at least 1½ and preferably from 2 to 3 times the stoichiometric quantity necessary to react with the labile hydrogen ions of the carboxylic groups provided by the acid present. The pine oil, or other alcohol of 4-12 carbon atoms contents, is employed in an amount necessary to impart fluidity to the composition comparable to that of the pine oil.

The order of admixing the ingredients of the fluid-loss preventive composition of the invention to be employed as an additive to a liquid used in fracturing formations is not highly critical except that the acid should be admixed with the other ingredients last. However, a smoother and more effective fluid-loss preventive is produced when the metal hydroxide, e.g., $Ca(OH)_2$, is first admixed with a substantial portion or all of the water within the range set out above to form a slurry. The slurry thus formed is preferably then admixed with the alcohol thinning agent, e.g., pine oil, and/or the oil solvent, e.g., kerosene, which may be added together or one after the other. At this stage, an oil-in-water emulsion exists. The carboxylic acid, e.g., tall oil, is then admixed with the emulsion which causes an inversion of the dispersed and continuous phases of the then existing emulsion to result in a water-in-oil emulsion.

The fluid-loss preventive thus made is stable to heat and moisture and is non-corrosive and substantially unreactive for the purposes of oil well treatment. It may be readily pumped or poured, and mixes readily by the aid of moderate agitation, into all known oil base fracturing liquids, e.g., crude oil, intermediate boiling range crude oil fractions, and oil-water emulsions. The fracturing liquid employed may also contain known gelling agents, thickeners, dispersants, particulate organic materials such as blown asphalt, particulate inorganic materials such as silica flour, and propping agents such as 20 to 60 mesh flint shot sand.

The fluid-loss composition of the invention is a concentrated additive ready for admixture with the bulk of a conventional oil base fracturing carrier liquid. Mixing of the fluid-loss preventive and the carrier liquid is usually performed at or near the well site. The ratio of the fluid-loss additive to the carrier liquid is not critical and is dependent upon the concentration of the additive, the characteristics of the carrier fracturing liquid, and the porosity and general character of the formation to be fractured. The amount of the fluid-loss preventive to employ per 1000 gallons of the fracturing liquid is between 5 and 100 gallons but is usually between 10 and 50 gallons and more often between 15 and 30 gallons of the fluid-loss composition per thousand gallons of the fracturing liquid used. Crude oil, e.g., oil produced in the field commonly called lease oil, is usually used as the fracturing liquid. It is preferred, in the practice of the invention, to admix between 0.5 and 6 pounds of 20-60 mesh sand per gallon of fracturing fluid therein which serves as a propping agent for newly formed fractures.

If desired, fracturing in accordance with the invention may be preceded by an acidizing step as is sometimes done in conventional well treating operations. Acidizing usually consists of injecting a 3 to 25 percent by weight aqueous solution of HCl containing a corrosion inhibitor, e.g., an alkyl pyridine, down the wellbore and into the formation. A wetting agent such as polyglycol may be used also, if desired, to enhance the wetting properties of the acidizing solution on the formation.

When sand is employed as a propping agent, a surfactant such as a monosulfate of a monoglyceride, e.g., sodium glyceryl monolaurate sulfate, or a sulfate of a dicarboxylic acid, e.g., octyl sodium sulfosuccinate sulfate, may be employed as an agent to aid in making the sand water-wet, if desired.

A fluid-loss preventive illustrative of the invention was prepared in accordance with the recipe set out in Table II below:

TABLE II

| Component | Quantity Used (percent by wt.) | Density (g./cc.) |
|---|---|---|
| Kerosene | 22.8 | 0.82 |
| Water | 34.7 | 1.0 |
| Calcium hydroxide | 8.0 | 2.24 |
| Tall oil | 27.0 | 0.97 |
| Pine oil | 7.5 | 0.924 |
| Product, thus prepared | | 0.982 |

The ingredients set out in the table were compounded as follows: Calcium hydroxide and water were intermixed in a mixing tank. To the resulting aqueous mixture were then admixed the kerosene and the pine oil. An emulsion was thus formed after which the tall oil was admixed therewith until a homogeneous emulsion was again obtained. The tall oil employed was that procured under the trade name Seecotol.

To show the effect upon fluid-loss by employing the fluid-loss preventive prepared according to the recipe above, the examples set forth in Table II below were run. The fluid-loss was measured according to two tests: The first test in accordance with A.P.I. RP 29, 3rd Edition (May 1950) of Standard Field Procedure for Testing Drilling Fluids (Tentative) by the American Petroleum Institute known as Code 29 and the second test, referred to herein as the HTHP test, wherein higher temperature and pressure conditions were applied as hereinafter explained. According to Code 29, the fluid to be tested is placed in a metal cylinder provided with a 60 to 80 mesh wire screen at the bottom thereof which supports a sheet of No. 50 Whatman filter paper which exposes 7 square inches to the fluid to be tested. A pressure of 100 p.s.i. is applied at room temperature and the amount of filtrate passing through the filtrate paper is measured after a given period of time, usually 30 minutes. In the HTHP test a similar apparatus is used except the pressure is 1000 p.s.i., the temperature 175° F., and the exposed area of the filter paper is only 3.72 square inches. It is obvious that the HTHP test is much more severe than Code 29 and low values obtained by the HTHP test are highly significant in demonstrating fluid-loss preventive properties.

TABLE III

| Test No. | Carrier Liquid | API Gravity | API RP 29 Test | | HTHP Test— 30 gals. Preventive [1] per 1,000 gals of oil |
|---|---|---|---|---|---|
| | | | No Additive | 30 Gals. Preventive [1] per 1,000 gals of oil | |
| 1 | Kerosene | 43.4 | 300 ml in 17 sec | 10 ml. in 30 min. | 14 ml. in 30 min. |
| 2 | Diesel oil | 36.1 | 300 ml. in 19 sec. | 10 ml. in 30 min. | 14 ml. in 30 min. |
| 3 | Aromatic Crude Oil | 26.7 | 300 ml. in 34 sec. | 7 ml. in 30 min. | 25.5 ml. in 30 min. |
| 4 | Bonegas Crude Oil | 37.2 | 300 ml. in 18 sec. | 38 ml. in 30 min. | 22 ml. in 30 min. |
| 5 | Hagist Distillate | 57.6 | 300 ml. in 10.5 sec. | 10 ml. in 30 min. | 22 ml. in 30 min. |
| 6 | Water in Oil Emulsion | | 200 ml. in 30 min. | | 18 ml. in 30 min. |

[1] The fluid loss preventive of the invention.

The water-in-oil emulsion was one prepared in accordance with copending application S.N. 759,861, filed September 9, 1958. The emulsifier therein described is prepared essentially by taking a VR-1 acid mixture (obtained by distilling at between 100° and 270° C. the oily layer produced as a by-product in the preparation of sebacic acid from castor oil) and admixing it with tetraethylene pentamine in a ratio of 100 parts by weight of the VR-1 acid to 7 parts of the tetraethylene pentamine. The emulsion therein described was prepared as follows: Water and oil in a ratio of about 75 parts by volume of water to about 25 parts by volume of kerosene were placed in a mixing container and 1 percent of the emulsifier (the VR-1-tetraethylene pentamine product described above) was admixed therewith.

An examination of the fracturing fluids prepared by admixing the composition of the invention with the carrier liquids set forth in Table III above, shows the highly effective character of the fluid-loss preventive of the invention. To demonstrate, the effect of varying the amount of fluid-loss preventive of the invention, a synthetic crude oil was made up consisting of 89 percent kerosene, 10 percent xylene and 1 percent water, by weight. Varying amounts of the fluid-loss preventive of the invention were added thereto and the fluid loss determined according to the HTHP test. The results are set forth in Table IV.

TABLE IV

| Test | Concentration of preventive in Gal./1,000 Gal. of oil | Fluid Loss, HTHP Test |
| --- | --- | --- |
| 7 | 100 | 10 ml. in 30 min. |
| 8 | 50 | 11 ml. in 30 min. |
| 9 | 30 | 14.5 ml. in 30 min. |
| 10 | 20 | 25 ml. in 30 min. |
| 11 | 15 | 28.5 ml. in 30 min. |
| 12 | 10 | 33 ml. in 30 min. |
| 13 | 5 | 68 ml. in 30 min. |
| 14 | 2.5 | 160 ml. in 1 min. |

An examination of the results set forth in Table IV shows that as little as 5 gallons of the fluid-loss preventive of the invention when added to 1000 gallons of the oil lessens significantly fluid loss. Although some small improvement in fluid-loss prevention was noted when more than 50 gallons of the composition were employed per 1000 gallons in comparison to employing 50 gallons, the results do not indicate sufficient improvement beyond that shown when 50 gallons is used to warrant employing greater than that amount. The table indicates that operable limits from an economic standpoint would be between 5 and 100 gallons of the fluid-loss preventive of the invention per 1000 gallons of the oil and the preferred range would be between 10 and 50 gallons of the fluid-loss preventive per 1000 gallons of oil.

To show the effect of employing (1) different hydroxides than calcium hydroxide, (2) different carboxylic acids than those provided by tall oil, (3) employing a sodium chloride brine instead of water, and (4) other $C_4$ to $C_{24}$ alcohols in place of pine oil, the tests set out in Table V below were run. The test results were determined by the HTHP test.

TABLE V

| Test | Changed Ingredient From Recipe of Table I | Fluid Loss HTHP Test |
| --- | --- | --- |
| 15 | CaO for Ca(OH)$_2$ | 24 ml. in 30 min. |
| 16 | NaOH for Ca(OH)$_2$ | 160 ml. in 1 min. |
| 17 | KOH for Ca(OH)$_2$ | 160 ml. in 1 min. |
| 18 | Neofat [1] 4270 as described hereinbefore for tall oil. | 18 ml. in 30 min. |
| 19 | Oleic acid for tall oil | 32 ml. in 30 min. |
| 20 | Caproic acid for tall oil | 25 ml. in 30 min. |
| 21 | Palmitic acid for tall oil | 47 ml. in 30 min. |
| 22 | Abietic acid for tall oil | 160 ml. in 3.5 min. |
| 23 | Saturated sodium chloride brine for water. | 18 ml. in 30 min. |
| 24 | Natural pine oil for synthetic pine oil | 19 ml. in 30 min. |
| 25 | Butanol for synthetic pine oil | 37 ml. in 30 min. |
| 26 | Cyclohexanol for synthetic pine oil | 29 ml. in 30 min. |

[1] Neofat is a mixture of fatty acids consisting of roughly equal weights of saturated fatty acids, chiefly palmitic with a lesser amount of stearic, and of unsaturated fatty acids, chiefly oleic with a lesser amount of linoleic.

An examination of the results set forth in Table V shows that calcium oxide is a satisfactory alternative for calcium hydroxide but that sodium hydroxide and potassium hydroxide are definitely unsatisfactory. Mixtures of myristic, palmitic, stearic, oleic and linoleic, as represented by the Neofat in Test 18, are a satisfactory acid to employ. Such single acids as oleic, caproic, and palmitic are also satisfactory alternatives for the tall oil. The table does show, however, that abietic acid alone is not satisfactory for the purposes of the invention. However, the suitability of tall oil indicates that mixtures of such acids as oleic and linoleic with or without linolinic and small percentages of saturated fatty acids in the presence of appreciable amounts of abietic acid offer certain advantages over a mixture of aliphatic acids. Test 23 shows that brines may be substituted for water without deleterious effects. Tests 24, 25 and 26 of Table V show that natural pine oil, butanol, cyclohexanol may all be substituted satisfactorily for synthetic pine oil.

To show the effectiveness of the fluid-loss preventive of the invention when employed in a fracturing operation, the following example is set forth:

250 pounds of calcium hydroxide and 1132 pounds of water were admixed in a 500-gallon mixing tank to produce a slurry. To this slurry were added 251 pounds of synthetic pine oil and 743 pounds of kerosene. At this point an oil-in-water emulsion had formed. 880 pounds of Seecotol brand crude tall oil were admixed with the oil-in-water emulsion and mixing continued until a water-in-oil emulsion was formed. The batch of fluid-loss preventive thus prepared amounted to 3262 pounds or about 400 gallons. A well was selected to be treated in the Spraberry Pool, Dawson County, Texas, which had a lower zone which had been abandoned and brought back to the present depth of 7436 feet. The object of the treatment herein described was to fracture an unproducing zone of the well. The fracturing medium employed was crude oil having suspended therein water-wet sand, to serve as a propping agent, and the liquid fluid-loss preventive prepared above.

In accordance with common practice, the fracturing operation was preceded by an acidizing step which consisted of injecting, down the well and into the formation, an admixture consisting of 250 gallons of 15 percent aqueous hydrochloric acid containing 1.25 gallons of mixed alkyl pyridenes as a corrosion inhibitor. The sand was made water-wet by placing 150 gallons of water in a mixink tank, admixing therewith 25 pounds of sodium chloride and 15 pounds of a common detergent known as Tide and 15,000 pounds of 20 to 40 mesh sand. The actual treating operation preceded as follows:

300 gallons of the above-prepared fluid-loss preventive of the invention were admixed with 11,130 gallons, 265 barrels, of crude oil in a large storage tank and circulated therein for about an hour to disperse the additive.

At the beginning of the treatment the wellbore was full of water. The water was displaced by pumping lease crude oil down the tubing and up into the annulus, it requiring about 150 barrels of oil to accomplish this. Thereafter, 6 barrels of the hydrochloric acid solution described above were pumped down the tubing followed by 28 barrels of additional crude oil. This positioned or spotted the acid solution opposite the perforations into the zone to be treated. The valve at the top of the annulus was then closed and 20 barrels of additional crude oil pumped down the tubing under pressure. This forced the 6 barrels of acid and 14 barrels of the oil out into the formation. The well as then shut in for two hours to permit acidizing to take effect. That is, to permit the acid to react with limestone present in the formation and soften the formation somewhat to make it easier to initiate a fracture.

Thereafter, 45 barrels of crude oil were pumped down the tubing and out into the formation. At this time, the 265 barrels of the mixture of crude oil obtained from the field admixed with the 300 gallons of the fluid-loss preventive of the invention, described above, were pumped down both the annulus and down the tubing while feeding thereto, 20 to 40 mesh sand at a substantially uniform rate sufficient to inject 15,000 pounds of sand during the injection of the mixture. This forced 95 barrels of the lease crude oil out into the formation. 170 barrels of crude oil flush were then pumped down the annulus which forced the crude oil, then in the well and in the annulus above the perforations, out into the formation. The well was then shut in and 10 barrels of additional crude oil pumped down the tubing to further force the fracturing crude oil, remaining below the tubing, out into the formation. The treatment was then complete.

The pressure readings shown during the treatment of the well and the behavior of the fracturing fluid showed that the material of this invention functioned very effectively to prevent fluid loss and to enable high fracturing pressures to build up within less time than is usually employed. A successful fracture, as shown by increased production from the well when put back in production, was evidence of the highly effective nature of the fluid-loss preventive of the invention when employed in a fracturing fluid employed to fracture a fluid-bearing formation in accordance with the invention.

Having described the invention, what is claimed and desired to be protected by Letters Patent is:

1. An emulsified fluid-loss preventive additive for admixture with a fracturing liquid for fracturing subterranean formations consisting by weight of: 100 parts of a mixture of between 37 and 52 percent fatty acids of which unsaturated fatty acids predominate; from 32 to 65 percent of abietic acid, and not over 8 percent non-saponifiable matter; a polyvalent metal hydroxide in an amount sufficient to provide an excess of the stoichiometric quantity to react with the carboxylic groups of the acid; a hydrocarbon oil derived from petroleum in an amount between 50 and 225 parts; between 75 and 200 parts of water containing from 0 up to the point of saturation of a soluble inorganic salt; and terpene alcohols in an amount between 10 and 60 parts.

2. A fluid-loss preventive emulsion for admixture with a liquid selected from the class consisting of water-oil emulsions and hydrocarbon oils for use in fracturing subterranean formations consisting by weight of: 100 parts tall oil, 15 to 60 parts $Ca(OH)_2$, 65 to 100 parts kerosene, 50 to 225 parts water, and 10 to 60 parts pine oil.

3. A water-in-oil emulsion-type hydraulic fracturing fluid for fracturing subterranean formations traversed by a well consisting of between 5 and 100 parts by volume of the fluid-loss preventive emulsion of claim 2 and a thousand parts by volume of a fracturing liquid selected from the class consisting of water-oil emulsions and hydrocarbon oils.

4. A fluid-loss preventive emulsion for admixture with a liquid selected from the class consisting of water-oil emulsions and hydrocarbon oils for use in fracturing subterranean formations consisting by weight of: 100 parts tall oil, 25 to 50 parts $Ca(OH)_2$, 70 to 90 parts kerosene, 75 to 200 parts water, and 20 to 40 parts pine oil.

5. A fluid for hydraulic fracturing of subterranean formations consisting of (1) a minor proportion of a fluid-loss preventive prepared by admixing water containing from 0 up to the point of saturation of a water-soluble inorganic salt dissolved therein with a hydrocarbon oil in relative amounts sufficient to form a water-in-oil emulsion, a carboxylic acid containing between 8 and 18 carbon atoms per molecule, at least about 35 percent by weight thereof being fatty acids, an hydroxide of a polyvalent metal in excess of the stoichiometric quantity required to react with the carboxylic groups of said acid, said acid and hydroxide being present in sufficient amounts to effect emulsification of the water and hydrocarbon oil, and a mono-alcohol containing between 4 and 12 carbon atoms per molecule in sufficient amount to impart fluidity to said fluid-loss preventive and (2) a major proportion of a carrier fracturing liquid selected from the class consisting of liquid hydrocarbons having a viscosity of between 5 and 500 cps. at 80° F.

6. The fluid of claim 5 which has suspended therein between 0.5 and 6 pounds of 20 to 60 mesh sand per gallon of said fluid.

7. The fluid of claim 5, wherein said carboxylic groups are provided by admixing a sufficient amount of tall oil with said water, excess polyvalent metal hydroxide, and mono-alcohol in said fluid loss preventive.

8. The fluid of claim 5, wherein said hydroxide is $Ca(OH)_2$.

9. The method of fracturing a fluid-bearing subterranean formation traversed by a wellbore consisting of injecting down the wellbore and into said formation at fracturing pressures, the fracturing fluid of claim 3.

10. The method of fracturing fluid-bearing subterranean formations traversed by a wellbore consisting of injecting down the wellbore and forcing into said formation at fracturing pressures, the fracturing fluid described in claim 6.

References Cited in the file of this patent
UNITED STATES PATENTS

| | | |
|---|---|---|
| 2,383,906 | Zimmer et al. | Apr. 28, 1945 |
| 2,573,960 | Fischer | Nov. 6, 1951 |
| 2,702,787 | Freeland | Feb. 22, 1955 |
| 2,793,996 | Lummus | May 28, 1957 |
| 2,794,779 | Cardwell et al. | June 4, 1957 |
| 2,825,409 | Ring | Mar. 4, 1958 |
| 2,869,643 | Schuessler et al. | Jan. 20, 1959 |